United States Patent [19]
Guida

[11] Patent Number: 5,204,773
[45] Date of Patent: Apr. 20, 1993

[54] ULTRAVIOLET LIGHT FILTER AND FILTER SYSTEM

[75] Inventor: Renato Guida, Wynantskill, N.Y.

[73] Assignee: General Electric Company, Schenectady, N.Y.

[21] Appl. No.: 810,266

[22] Filed: Dec. 19, 1991

Related U.S. Application Data

[63] Continuation-in-part of Ser. No. 590,847, Oct. 1, 1990, abandoned.

[51] Int. Cl.⁵ .............................................. G02B 5/22
[52] U.S. Cl. ................................. 359/361; 359/885
[58] Field of Search ............... 359/350, 361, 885, 887, 359/888, 889, 890; 250/505.1

[56] References Cited

U.S. PATENT DOCUMENTS 4,778,263 10/1988 Foltyn .
4,793,668 12/1988 Longstaff ........................... 359/885
5,020,887  6/1991 Orler et al. ........................ 359/885

OTHER PUBLICATIONS

Standley et al, "Properties of Ion-Bombarded Fused Quartz for Integrated Optics", *Applied Optics*, vol. 11, pp. 1313-1316, Jun., 1972.

*Primary Examiner*—Bruce Y. Arnold
*Assistant Examiner*—J. P. Ryan
*Attorney, Agent, or Firm*—Howard A. Skaist; Marvin Snyder

[57] ABSTRACT

An ultraviolet light filter is provided by implanting an ultraviolet light absorbing chemical species into an ultraviolet light transmissive substrate. Two such filters having gradient distributions may be overlapped and shifted relative to each other to provide adjustable attenuation.

26 Claims, 6 Drawing Sheets

ULTRAVIOLET LIGHT FILTER AND FILTER SYSTEM

CROSS-REFERENCE TO RELATED APPLICATIONS

This is a continuation-in-part application to copending patent application Ser. No. 07/590,847, "ULTRAVIOLET LIGHT FILTER AND FILTER SYSTEM," filed Oct. 1, 1990 and now abandoned.

BACKGROUND OF THE INVENTION

1. Field of the Invention

The present invention relates to the field of filters, and more particularly, to the field of filters for ultraviolet light.

2. Background Information

The use of ultraviolet laser light to ablate material from a workpiece in order to modify the shape of the workpiece is used in a number of fields. In most such systems, a fixed laser pulsed energy results in the ablation of a fixed quantity of material from the workpiece. Typically, a pulsed excimer laser is employed for such ablation processes. These lasers typically emit their laser beam at 193 nm or 248 nm. Since the excimer laser is a pulsed laser, each pulse to which a workpiece is exposed ablates the same quantity of material for a uniform workpiece. Where it is desired to remove a quantity of material which is not an integral multiple of the quantity removed by one pulse, additional control is required. One way of adjusting the amount of material ablated per pulse is to change the beam fluence by changing the laser power. This technique suffers from a variety of disadvantages, including reduction of the power to the point where the beam becomes unstable or non-reproducible. Further, adjustment of the power of the laser is a relatively slow process. Alternatively, a variable beam expander may be employed. However, such expanders are expensive and reduce the collimation of the laser beam. Available commercial ultraviolet light filters Cannot be used to reduce the intensity of the ultraviolet light because the ultraviolet light damages their filter properties.

Consequently, there is a need for an improved technique for adjusting the intensity of ultraviolet light.

OBJECTS OF THE INVENTION

Accordingly, a primary object of the present invention is to provide an ultraviolet light filter which may be used to control the intensity of an excimer laser without damage to the filter.

Another object of the present invention is to provide a system for rapidly adjusting the intensity of an excimer laser beam.

Another object of the present invention is to provide an improved technique for modifying the beam energy profile of an ultraviolet light beam.

SUMMARY OF THE INVENTION

The above and other objects which will become apparent from the specification as a whole, including the drawings, are achieved in accordance with the present invention by distributing an ultraviolet light absorbing chemical species within an ultraviolet light transmissive substrate.

In accordance with one embodiment, a quartz or other ultraviolet light transmissive substrate is ion implanted with an ultraviolet light absorbing chemical species and then annealed to stabilize the distribution of that ultraviolet light absorbing chemical species. The result is a stable ultraviolet light filter.

In accordance with another embodiment, a pair of such filters having graded distributions of the ultraviolet light absorbing chemical species are positioned in series in the optical path of an ultraviolet beam and the degree of attenuation is adjusted by relative movement of the two substrates to change the quantity of ultraviolet light absorbing chemical species in the path of the ultraviolet light beam.

In accordance with another embodiment, the implanted pattern of ultraviolet absorbing chemical species is tailored to modify the energy profile across a beam passing therethrough. In particular, with a beam having a Gaussian energy distribution, an absorption pattern which leaves the emerging beam with a flat energy distribution enables uniform removal of material across the area treated by the resulting beam.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION

In accordance with the present invention, an ultraviolet light filter is fabricated from a quartz substrate which is substantially transparent to ultraviolet light or fabricated from another ultraviolet light transmissive substrate by ion implanting into the substrate a chemical species which absorbs ultraviolet light at the frequency of interest.

Six quartz Suprasil II substrates, each $1 \times 1 \times 1/16$ inch, were obtained from Heraeus. One of these was kept as a control sample (A) and the other five (B-F) were ion implanted with various dosages of phosphorus, as shown in the accompanying table. It will be understood that other materials substantially transparent to ultraviolet light would provide effective substrates for ion implantation, such as magnesium fluoride or calcium fluoride. Quartz was employed in this particular embodiment primarily due to its ready availability.

TABLE

| Sample Implant | A | B | C | D | E | F |
|---|---|---|---|---|---|---|
| $1 \times 10^{15}$ ions/cm$^2$ | — | X | — | X | — | X |
| $5 \times 10^{15}$ | — | — | X | X | — | X |
| $1 \times 10^{16}$ | — | — | — | — | X | X |
| Total dose | 0 | $1 \times 10^{15}$ | $5 \times 10^{15}$ | $6 \times 10^{15}$ | $1 \times 10^{16}$ | $1.6 \times 10^{16}$ |

Figure 1:
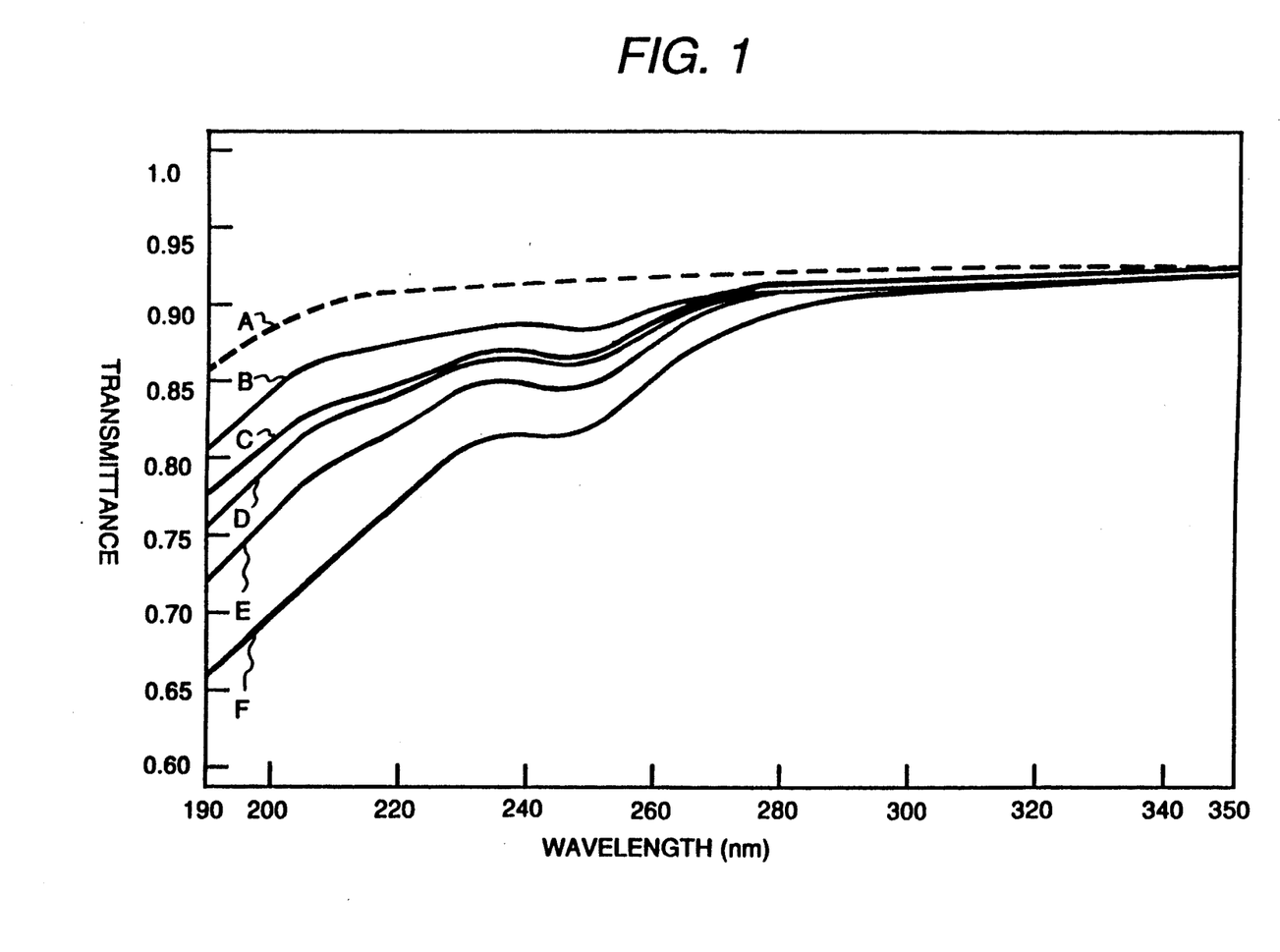
FIG. 1 is a graph showing the as-implanted transmission characteristics of a plurality of filters having different densities of phosphorus.
Figure 2:
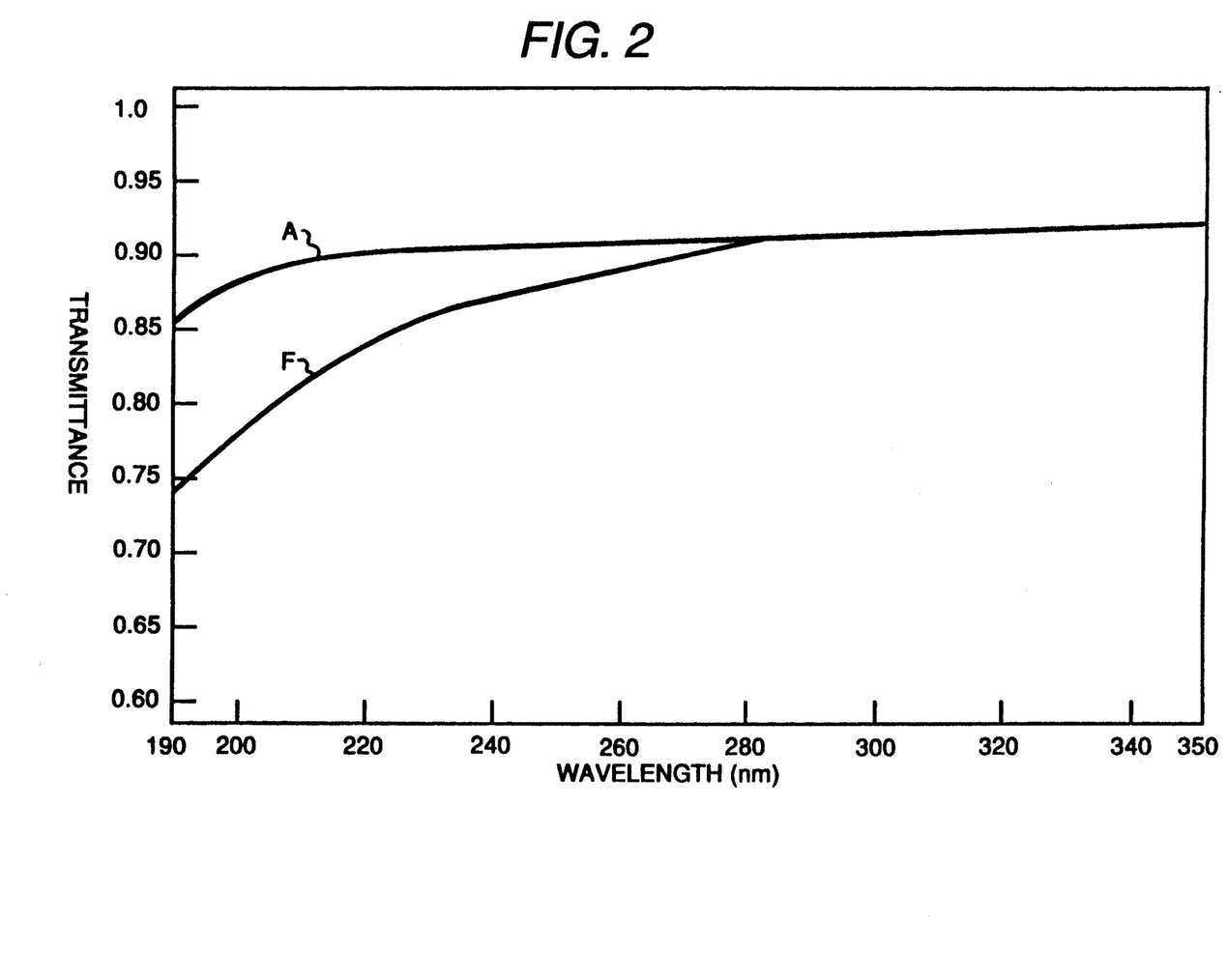
FIG. 2 is a graph showing the characteristics of one of the FIG. 1 samples after annealing.

The transmittance spectrum for each of these samples was then measured and is shown in the graph in FIG. 1. The curve for sample A in FIG. 1 shows that the quartz substrate is substantially transparent to ultraviolet light for wavelengths in the range of approximately 190 nanometers to 350 nanometers. It will be noted from FIG. 1 that the ultraviolet light transmittance decreased with increasing implantation dose. Samples A and F were then annealed with 5,000 pulses of excimer laser light at a pulse fluence of 0.5 W/cm$^2$ and their transmittance spectrum remeasured as illustrated in FIG. 2. As can be seen, the transmittance curve is unchanged for the control sample A, but has changed for sample F as a result of this annealing. Samples A and F were then exposed to an additional 10,000 pulses of the excimer laser and their transmittance curves remeasured. The curves for samples A and F were identical to that in FIG. 2.

Figure 7:
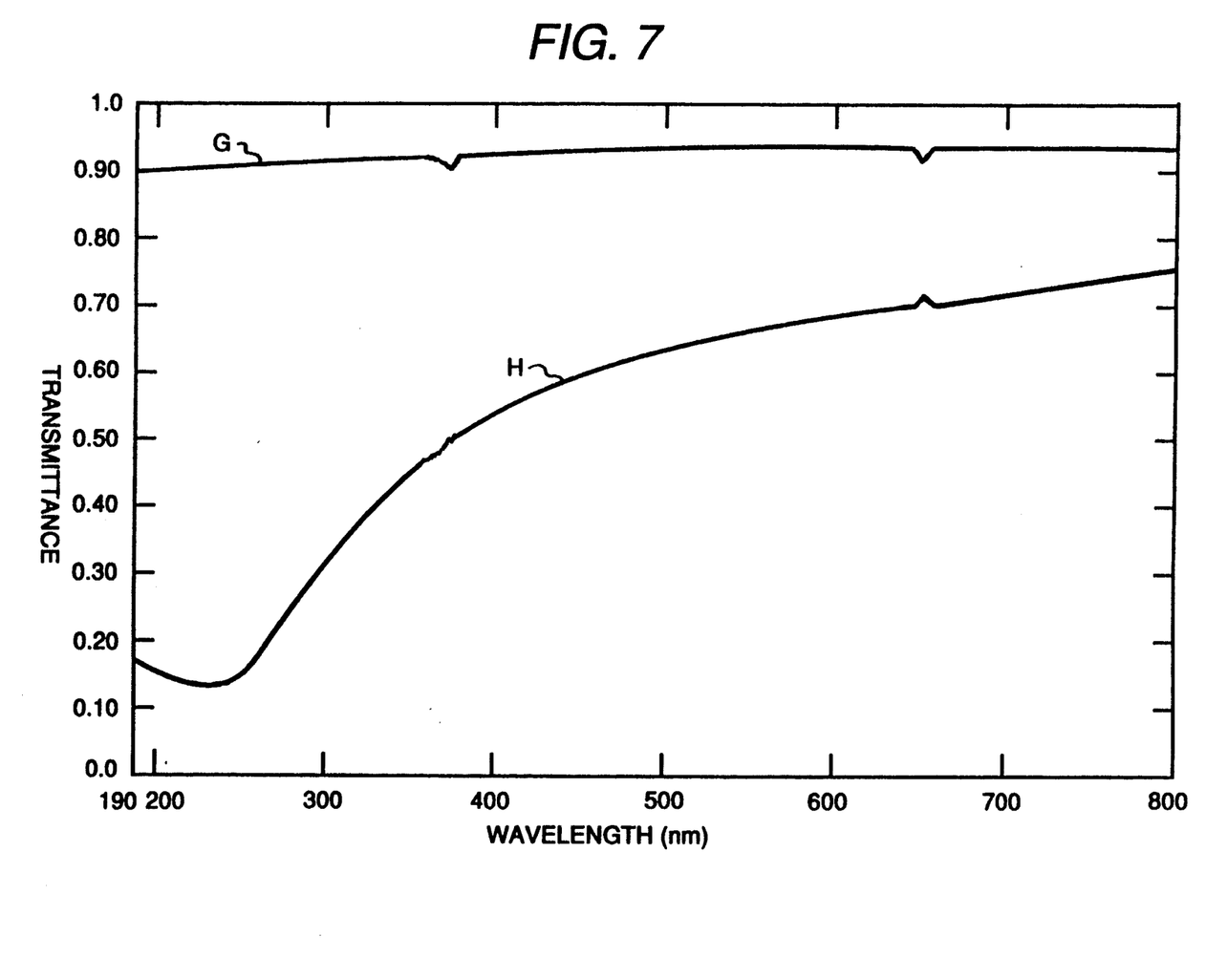
FIG. 7 is a graph showing the as-implanted transmission characteristics of a filter having a density of lead ion implanted.
Figure 8:
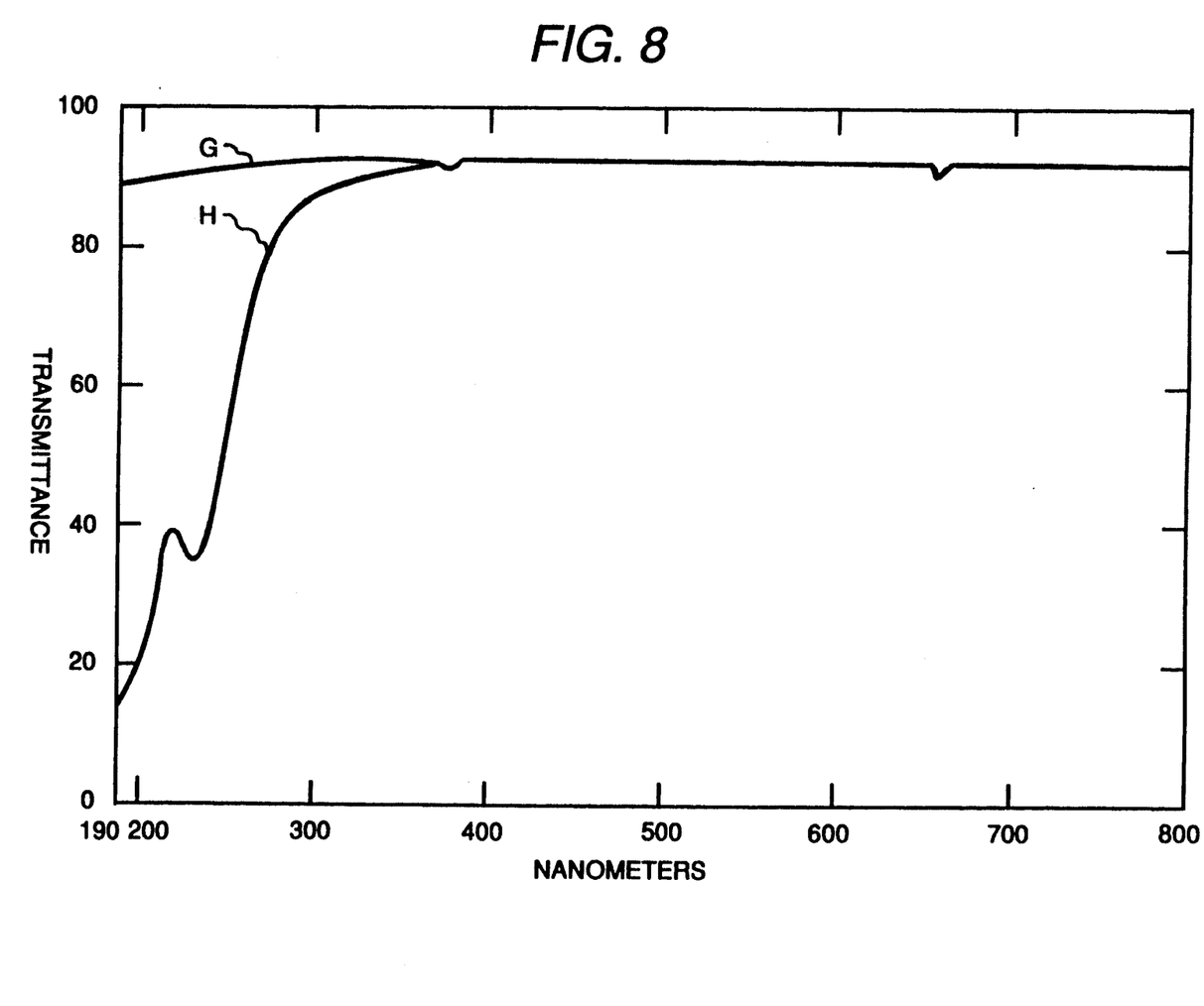
FIG. 8 is a graph showing the characteristics of the FIG. 7 sample after annealing.

A quartz Substrate like those described above was also obtained for ion implantation with lead. A portion G of the substrate was not ion implanted and a portion H was implanted with a total dose of $1 \times 10^{16}$ ions/cm$^2$. The transmittance spectrum of both portions was measured and is shown in the graph in FIG. 7. The curve for portion G in FIG. 7 shows that the quartz substrate is substantially transparent to ultraviolet light for wavelengths in the range of approximately 190 nanometers to 800 nanometers. These portions were then annealed with 20,000 pulses of excimer laser light at a pulse fluence of 0.5 W/cm$^2$ and their transmittance spectrum was remeasured as illustrated in FIG. 8. Only the ion implanted portion of the substrate has a transmittance curve that changed as a result of the annealing. Exposure to 10,000 additional pulses of excimer laser light produced identical curves.

Thus, the initial exposure of the implanted substrates to ultraviolet light annealed the filters' characteristics to a stable state. While this annealing was done by use of a laser beam, the annealing may also be done by thermal treatment in a manner well-known in the semiconductor industry, if desired.

The stability of the transmittance spectrums over the large number of pulses establishes the stability of this type of filter for use in controlling attenuation of excimer laser and other ultraviolet light beams. FIGS. 2 and 8 respectively provide the information to calculate the dosage of phosphorus or lead to achieve a particular transmittance. For example, twice the dosage of these respective samples will double the difference between the transmittance resulting from a single dose and the transmittance of the control sample. While these specific samples were implanted with either phosphorus or lead, it will be understood that other elements and species may be employed as the ultraviolet light absorbing chemical species. Phosphorus and lead were used in these experiments because of their ready availability in an available implantation apparatus. In general, a filter may be fabricated from any element or species capable of being implanted; however, appropriate chemical species may be determined by reference to handbooks of the light absorbance spectra of chemical species. Furthermore, once a dosage of chemical species has been ion implanted, one skilled in the art may produce a graph as illustrated in FIGS. 2 and 8 to calculate the dosage to achieve a particular transmittance. It will be appreciated by those skilled in the art that materials having a relatively high atomic weight compared to phosphorus, such as arsenic, boron, gold, xenon, radon, or uranium, should result in transmission of less ultraviolet light for approximately the same dose of the particular material. Nonetheless, it will be understood that other factors may also affect the capability of an ion implanted material to absorb ultraviolet light. Furthermore, depending on the filter application, the shape of the resulting transmittance curve for a particular range of wavelengths may make a particular material more or less desirable for use as the ultraviolet light absorbing chemical species.

The intensity of an excimer laser beam may be adjusted by substituting different filters having different densities in its light path. However, that is a relatively slow process and exhibits a granularity determined by the difference in densities of the various filters.

Figure 3:
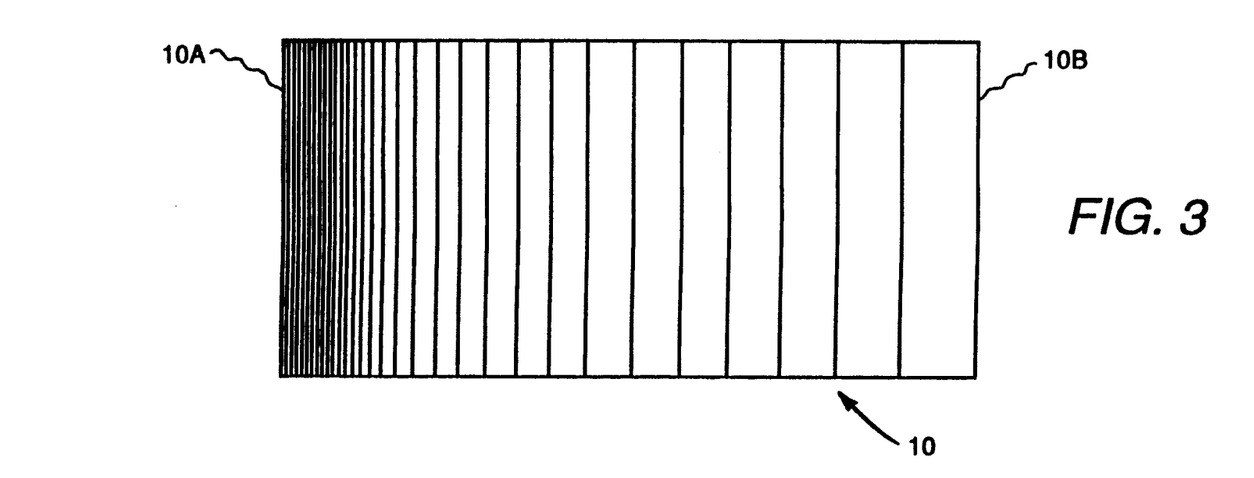
FIG. 3 is a plan view illustration of a variable density filter in accordance with the present invention.

In FIG. 3, a rectangular filter 10 having a graded distribution of ultraviolet light absorbing chemical species is illustrated in schematic plan view. The denser placement of the lines at the left-hand side 10A of the filter indicates a greater concentration of the absorbing species than the wider placement of the lines at the right-hand side 10B of the filter. Such a graded distribution may be provided by ion implantation through an aperture while translating the filter substrate behind the aperture at an increasing velocity to reduce the quantity of ions implanted in the later exposed portions of the substrate. As will be appreciated by those skilled in the art, for situations where a filter having a graded distribution is unnecessary, an ultraviolet light filter in accordance with the present invention may also be fabricated by thermal doping, as is well-known in the art, instead of by ion implantation.

Figure 4:
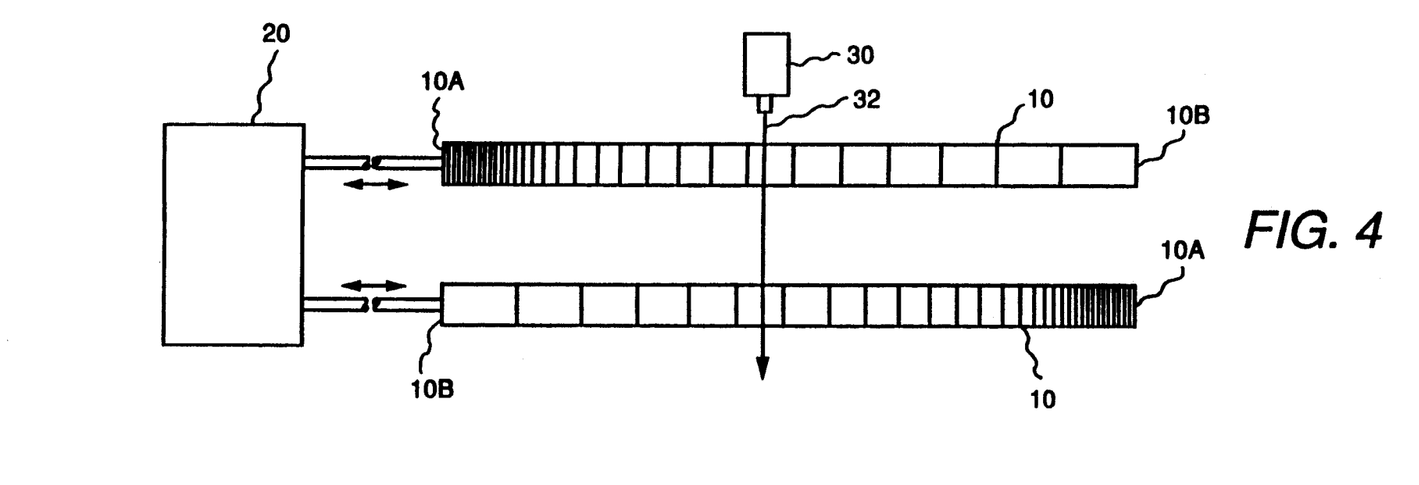
FIG. 4 is a stylized illustration of an ultraviolet light intensity control system employing two filters like that in FIG. 3.

A pair Of variable density filters 10 of the type shown in FIG. 3 are shown in FIG. 4 positioned in series along the path of an ultraviolet light beam 32 from a laser 30. A system 20 for translating the two filters relative to each other controls the quantity of the ultraviolet light absorbing chemical species disposed in the path of the ultraviolet light beam 32 whose intensity is to be controlled. The system 20 can be a linear motor, a stepper motor or any other appropriate mechanism. For a maximum control range, both filters should be movable. However, only one needs to be movable in order to provide adjustable attenuation.

Figure 5:
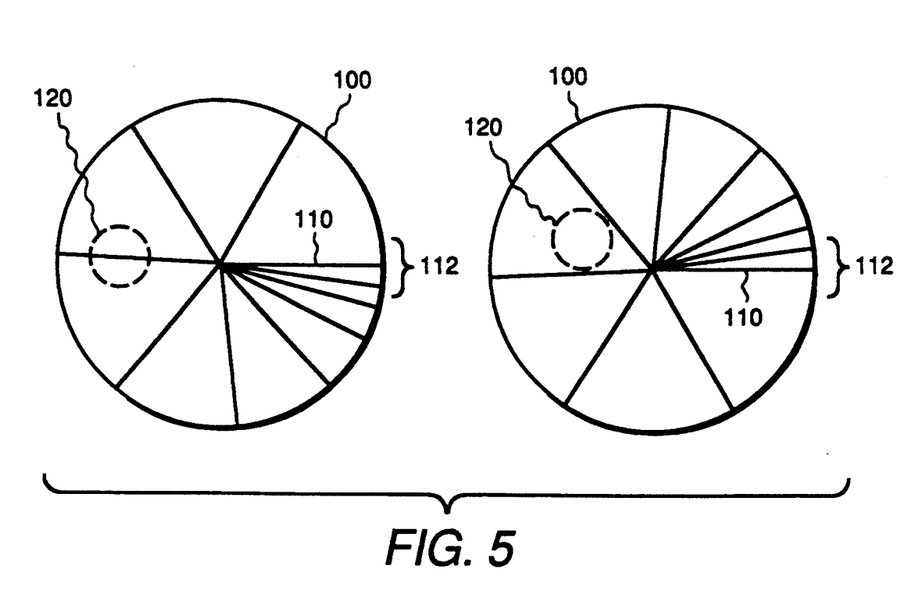
FIG. 5 is a plan view illustration of an alternative configuration for the filters of the FIG. 4 system.

In FIG. 4, filters 10 are positioned with their distribution gradients in opposed relation whereby sliding their heavy distribution ends 10A toward each other increases attenuation while sliding those ends away from each other decreases attenuation with the attenuation being constant across the filter pair in any given position of the filter pair. In this manner, the ultraviolet light beam is affected uniformly by the filter, whereas either filter alone would result in a gradient in the attenuation across the beam. In FIG. 5, an alternative configuration 100 for filters for use in an intensity control system is illustrated in plan view. These two filters 100 are circular and are implanted with an ultraviolet light absorbing chemical species gradient which is an arc of a circle. When positioned in series, the degree of attenuation for a beam located in the region 120 is controlled by rotating the two filters relative to each other. To maintain uniform attenuation, the portions 112 of these disks should not be brought into alignment with the beam because of the abrupt change in absorbing species concentration at the line 110. Where circular filters are employed in a system similar to that shown in FIG. 4, intensity control is provided by rotating the filters relative to each other rather than sliding them as in the FIG. 4 embodiment.

Figure 6:
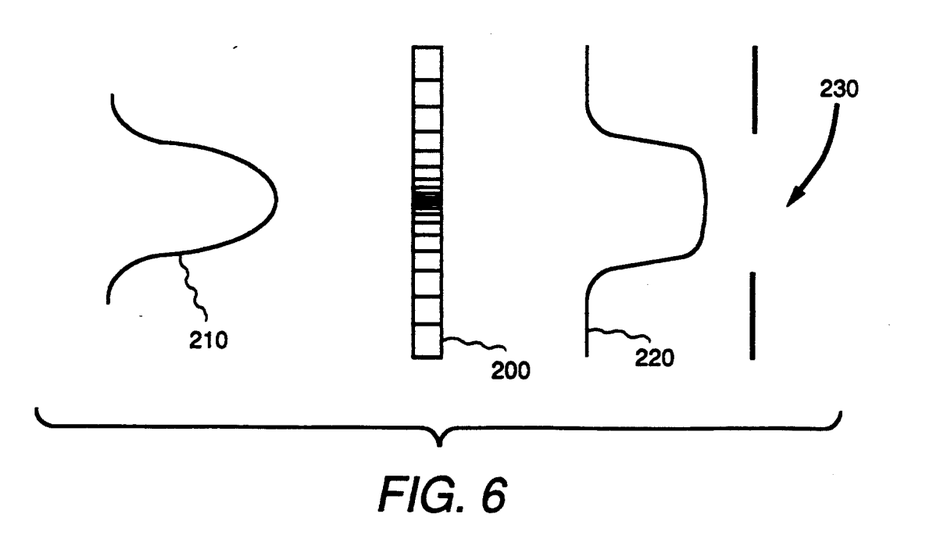
FIG. 6 illustrates modification of the energy profile of an ultraviolet laser beam.

If it is desired to change the relative energy fluence across the spot of a laser or other ultraviolet light beam, then a filter may be implanted with an ultraviolet light absorbing chemical species distribution which is circularly symmetric (for a circularly symmetric beam energy profile) and varies radially. With a higher density at the center of such a circular distribution, more attenuation is provided in the center of a beam centered on that spot and with a minimum distribution at the center, more attenuation is provided along the periphery of such a beam. A structure of this type in which the center of the beam is attenuated more than the outside of the beam has great utility in laser ablation systems in which it is desired to remove a uniform amount of material across the entire area being treated. In particular, a filter 200 is fabricated whose absorption characteristics are the inverse of the laser beam energy profile, as shown in FIG. 6. Passing a laser beam having the energy profile 210 through this filter attenuates the central portion of the beam to provide an emerging beam having an energy profile 220 which is substantially flat across that portion of the beam. The beam may then be limited to that flat energy portion by passing it through an appropriate aperture 230. This distribution may be elliptically symmetric or circularly symmetric in accordance with the symmetry of the beam's energy profile.

In the absence of this technique, the initial beam is normally limited to the very center of the beam and then expanded to provide a wider beam having substantially uniform energy across the beam. That is much less energy efficient than the inventive technique because so little of the beam is actually used and it has the further disadvantage of requiring expensive beam expanders and substantially more volume.

The implantation of the ultraviolet light absorbing chemical species into the quartz or other ultraviolet light transmissive substrate and its distribution within the interior of the quartz or other substrate, rather than along its surface, provides several advantages including prevention of removal of the absorbing species either by abrasion or evaporation with the result that the absorption is constant over time. While it is presently preferred to implant the ultraviolet light absorbing species into the quartz or other ultraviolet light transmissive substrate, it should be recognized that such species may also be introduced into the quartz or other substrate during the formation of the substrate.

It will be recognized that the attenuation effects of two such filters positioned in series is cumulative. Consequently, the order of the filters is unimportant to such use.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A filter for reducing the intensity of ultraviolet light comprising:
   a substrate which is substantially transparent to ultraviolet light at least for wavelengths in the range of 193 nanometers to 248 nanometers inclusive; and
   a pattern of ultraviolet light absorbing chemical species distributed within said substrate.

2. The filter recited in claim 1, wherein:
   said substrate is substantially transparent to ultraviolet light at least for wavelengths in the range of approximately 190 nanometers to 350 nanometers.

3. The filter recited in claim 1, wherein:
   said ultraviolet light transmissive substrate comprises one of the group consisting of quartz, magnesium fluoride, and calcium fluoride.

4. The filter recited in claim 3, wherein:
   said ultraviolet light absorbing chemical species comprises one of the group consisting of phosphorus, lead, and combinations thereof.

5. The filter recited in claim 4, wherein:
   said substrate comprises quartz.

6. The filter recited in claim 3, wherein:
   said ultraviolet light absorbing chemical species comprises one of the group consisting of phosphorus, lead, uranium, arsenic, boron, gold, xenon, radon, and combinations thereof.

7. The filter recited in claim 1, wherein:
   the distribution pattern of said ultraviolet light absorbing chemical species is uniform across the active portion of said substrate.

8. The filter recited in claim 1, wherein:
   the distribution pattern of said ultraviolet light absorbing chemical species is graded in a direction parallel to a gradient line.

9. The filter recited in claim 8, wherein:
   said gradient line is substantially straight.

10. The filter recited in claim 8, wherein:
    said gradient line is curved.

11. The filter recited in claim 10, wherein:
    said gradient line is substantially the arc of a circle.

12. A filter for reducing the intensity of ultraviolet light comprising:
    a substrate which is substantially transparent to ultraviolet light; and
    a pattern of ultraviolet light absorbing chemical species distributed within said substrate, the distribution pattern exhibiting elliptical symmetry.

13. The filter recited in claim 12, wherein:
    said distribution pattern is densest at the center of said distribution pattern and decreases outward.

14. The filter recited in claim 13, wherein:
    said distribution pattern is Gaussian.

15. The filter recited in claim 12, wherein:
    said distribution pattern is circularly symmetric.

16. The filter recited in claim 15, wherein:

said distribution pattern is densest at the center of said distribution pattern and decreases outward.

17. The filter recited in claim 16, wherein:
said distribution pattern is Gaussian along a diameter of said circularly symmetric distribution pattern with the peak distribution at the center of the circle.

18. A filter for reducing the intensity of ultraviolet light comprising:
a substrate which is substantially transparent to ultraviolet light; and
a pattern of ultraviolet light absorbing chemical species distributed within said substrate, the distribution pattern being Gaussian.

19. A system for adjusting the intensity of a beam of ultraviolet light, comprising:
first and second substrates, each having a major surface, each having an ultraviolet light absorbing chemical species distributed therein with the distribution of that species being graded in a direction parallel to said major surface;
said first and second substrates being disposed in series across the path of said ultraviolet light with their graded distributions oriented in opposed relation;
means for shifting said substrates relative to each other to change the quantity of said ultraviolet light absorbing chemical species disposed in the path of said ultraviolet light.

20. The system recited in claim 19, wherein:
said first substrate is substantially larger in area than the cross-section of said beam of ultraviolet light.

21. The system recited in claim 20, wherein:
the gradients of said distributions are a straight line; and
said means for shifting comprises means for moving said first substrate in a direction parallel to the line of its gradient.

22. The system recited in claim 20, wherein:
the gradients of said distributions are an arc of a circle; and
said means for shifting comprises means for rotating said first substrate about the center of the circle of its gradient.

23. The system recited in claim 19, wherein:
the gradients of said distributions have an inverse relationship whereby
(1) the sum of the attenuations introduced by the two substrates is a constant across the entire cross-section of said beam of ultraviolet light for any given relative alignment of said substrates in which said beam passes an active portion of each of them,
(2) shifting said substrates relative to each other in a first direction increases said constant, and
(3) shifting said substrates relative to each other in an opposite direction decreases said constant.

24. A system for modifying the energy profile of a light beam comprising:
a substrate which is substantially transparent to said light disposed in the path of said light;
a pattern of chemical species distributed within said substrate which absorbs said light, said pattern having the symmetry of the energy profile of said beam, varying across said beam, and being inverse to the energy profile of said beam to provide a substantially flat energy profile for the central portion of the beam emerging from said substrate.

25. An annealed filter for reducing the intensity of ultraviolet light comprising a substrate substantially transparent to ultraviolet light and a pattern of ultraviolet light absorbing chemical species distributed therein;
said filter having an ultraviolet light transmittance spectrum which is substantially stable even following transmission of a laser beam through the active portion of said substrate.

26. A filter for reducing the intensity of ultraviolet light comprising:
a substrate which is substantially transparent to ultraviolet light; and
a pattern of ultraviolet light absorbing chemical species distributed within said substrate, said chemical species being ion implanted therein.

* * * * *